United States Patent [19]
Otto et al.

[11] Patent Number: 4,550,420
[45] Date of Patent: Oct. 29, 1985

[54] APPARATUS FOR RECORDING X-RAY RADIATION PICTURES, IN PARTICULAR IN THE COSMIC SPACE

[75] Inventors: Günther Otto; Gert Warmbold, both of Cologne, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 550,482

[22] Filed: Nov. 9, 1983

[30] Foreign Application Priority Data

Nov. 13, 1982 [DE] Fed. Rep. of Germany ....... 3242078

[51] Int. Cl.⁴ .............................................. G03B 41/16
[52] U.S. Cl. .................................... 378/171; 378/210; 378/208
[58] Field of Search ............... 378/101, 102, 171, 203, 378/208, 210, 60

[56] References Cited
U.S. PATENT DOCUMENTS 2,433,129 12/1947 Land ..................................... 378/166
2,470,743 5/1949 Hochgesang et al. .............. 378/171
3,440,422 4/1969 Ball et al. ............................. 378/171
4,093,859 6/1978 Davis et al. ............................. 378/7

FOREIGN PATENT DOCUMENTS 0014276 5/1970 Japan ................................... 378/177

Primary Examiner—Craig E. Church
Assistant Examiner—Charles Wieland
Attorney, Agent, or Firm—Spensley Horn Jubas & Lubitz

[57] ABSTRACT

All elements of the apparatus are mounted on a common base plate which can be housed as a module in a container. A high voltage source and an X-ray radiation source are provided in common in an angular housing. In the vicinity of the free end of the angular housing which end is averted from the high voltage source, a recording unit is positioned which consists substantially of a miniature camera housed in a protective casing with a motor for the film transport, and a film magazine. By this means, there is obtained, with the least space requirement, a distance as long as possible between the X-ray radiation source and the sample holder or recording unit.

22 Claims, 5 Drawing Figures

APPARATUS FOR RECORDING X-RAY RADIATION PICTURES, IN PARTICULAR IN THE COSMIC SPACE

BACKGROUND OF THE INVENTION

1. Field of the Invention:

The present invention relates to an apparatus for recording X-ray radiation pictures, in particular in the cosmic space, which apparatus includes an X-ray radiation source, a sample holder, a motor-driven photographic recording unit, a control unit and a high voltage source.

2. Description of the Prior Art:

Apparatuses of this kind have been used, among other applications, as a technique for testing metals. Apparatuses performing the rapid taking of sequential pictures have been used to test movements in molten metals or alloys. Above all, the behavior of alloy elements in molten metal alloys under space conditions without the influence of gravity is of high scientific interest, because knowledge may be gained therefrom which, for instance, can be used to produce metals of highest purity.

It is known in the art to use X-ray radiation devices for testing metals. To record the X-ray picture, devices have been used which may change the X-ray film for pictures in a rapid sequence. Picture frequencies up to 12 frames per second have heretofore been realized only by roll film changers making use of an unperforated film having a width of not more than 30 cm which is drawn from a supply roller through a gap between two reinforcing sheets. In taking the picture, the film is held flat, exposed and wound subsequently on a collecting roller. It is necessary in this process to alternatively accelerate and decelerate relatively high masses (wide film rolls). Thus, the roll film changers require a strong drive and a stable transport system. Moreover, the requirements concerning the mechanical properties of the film are very high. Additionally, the X-ray source combined with such a film changer has to provide a high voltage generator which is endowed with a repetivity sufficient for such rapid, repeated operation of the X-ray tube. The known X-ray devices having such performance characteristics are generally not suitable to be used in space because either their dimensions or their weight do not comply with the respective requirements for transport to the space environment.

SUMMARY OF THE INVENTION

It is the object of the present invention to provide an apparatus permitting an X-ray irradiation of objects under space conditions and having a weight as well as a dimensional requirement reduced to minimum achievable quantities.

To solve the above-described problem, according to the present invention, an apparatus is provided having an X-ray source, a recording unit and a sample holder mounted on a common base plate, so that the X-ray source is housed in a first leg of an angularly shaped housing and a high voltage source for the X-ray source is housed in a second leg of the angularly shaped housing, and so arranged that an aperture of the X-ray source can direct an X-ray from the source, at an acute angle relative to the second leg of the housing, towards the sample holder and recording unit which are positioned near the free end of the second leg of the housing.

The arrangement of all apparatus elements on the common base plate permits use of the device as a module within larger apparatus groups. Due to the X-ray source design in the form of an angular housing that contains both the high voltage source and the X-ray tube, it is possible to realize on quite a small surface an arrangement allowing an adequate, useful distance between the X-ray tube and the sample holder. Moreover, in view of the position of the high voltage source and the X-ray tube in one common housing, a high voltage line between the high voltage source and the X-ray tube is not exposed. It is additionally feasible to design the high voltage line to be of a short length and consequently to have low losses, since its spurious radiation can be kept as low as possible. To protect the high voltage line from damage, it may be also potted in plastic within the housing.

In a preferred embodiment of the invention, the photographic recording unit is a miniature camera enclosed in a padded protective housing. The miniature camera contains a film magazine and a motor for the film transport, and has a rear wall of the housing of the miniature camera which is adapted to provide a picture window for the passage of the X-ray. By providing the picture window in the rear wall of the housing of the miniature camera, scattering of the radiation is avoided between the sample and the film because the exposure is performed from the rear side of the miniature camera. As a result thereof, the sample may be located in the immediate vicinity of the film to obtain a sharp image.

The essential elements of the recording unit are commercially available and are of a mature design. They are generally insensitive to shock environments.

According to another aspect of the invention, the protective housing shields the exposed and unexposed film by means of a lead mask which extends over the total length of the outside facing of the protective housing on the side toward the X-ray source. The protective housing and the lead mask each have mutually aligned windows which are further in alignment with the picture window of the camera. The housing window can be covered advantageously by a first aluminum foil to protect the film against visible light.

Except for the picture window, the rear wall of the housing of the miniature camera can be coated with lead foil to provide additional shielding for the exposed and unexposed film in the magazine. The picture window can be covered by a second aluminum foil for added protection of the film against visible light exposure.

The film contained in the miniature camera may be an X-ray film, coated bilaterally with radiation-sensitive layers. It may be provided with miniature film perforations to control film transport so as to provide space for 150 consecutive X-ray pictures. A reinforcing sheet may be arranged parallel to the film in a position ahead of or behind the X-ray film relative to the direction of travel of the X-ray radiation. The reinforcing sheet is to provide a support to assist the film in retaining a flat exposure region.

According to a further aspect of the invention, the miniature camera is fitted with a device to fade in optical data on the film. This process may be achieved with a commercially available supplementary lens which may be accommodated within the space available within the protective housing. Optical data may be also faded in by the incorporation of a special rear wall optical data source so that electronically produced data may be imaged onto the film. Such data may be externally controlled. For instance, such a device could be used to fade in the time of each X-ray picture thereby recording the length of time between two X-ray photographs.

A principal embodiment of the invention will be explained hereinafter in more detail with reference to the drawings.

DETAILED DESCRIPTION OF THE INVENTION

Figure 1:
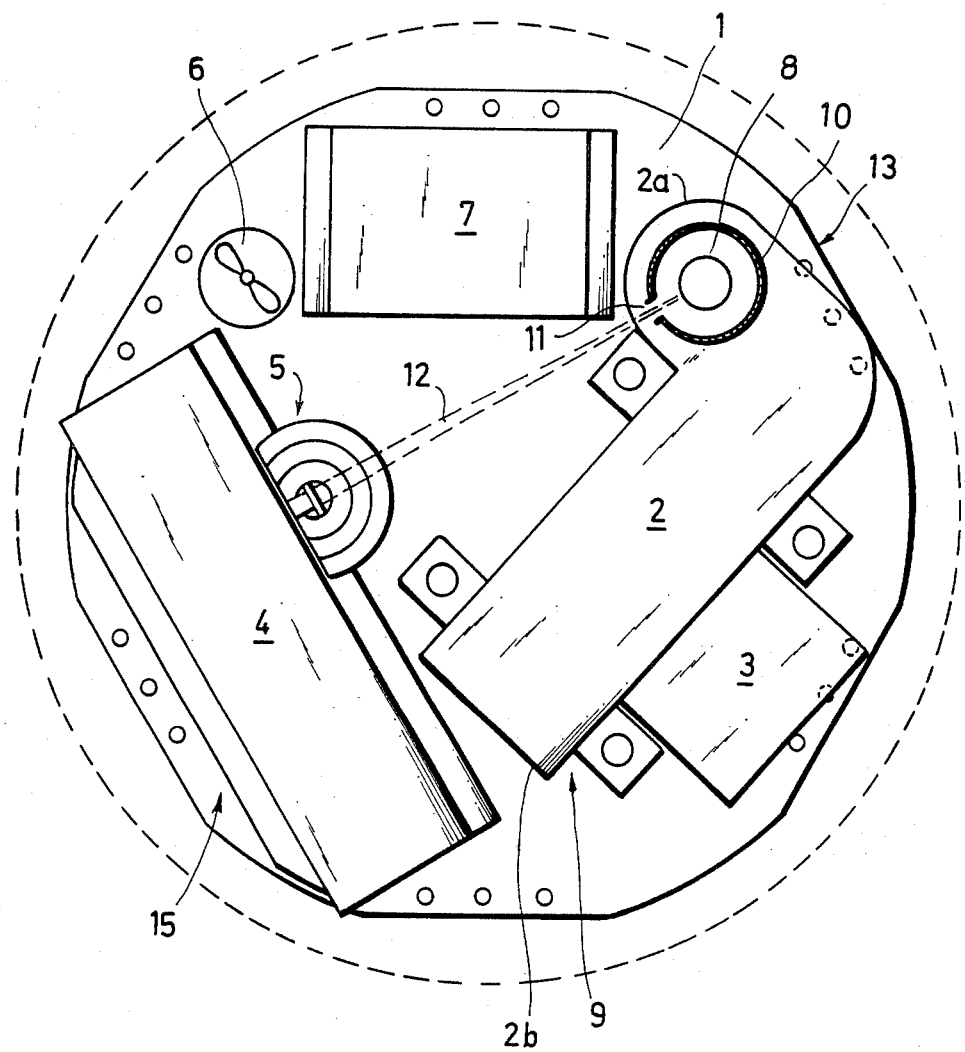
FIG. 1 is a plan view of a schematic construction of a preferred embodiment of the device.

Referring first to FIG. 1, the apparatus for recording X-ray pictures is formed as a base plate 1 on which all components of the assembly, except for an external current supply, can be mounted as an autonomous module. The apparatus may then be contained in a cylindrical container shown in outline in FIG. 1. Near the periphery of the base plate 1, an X-ray source 13 is mounted whose X-ray 12 is directed to impinge at right angles on a sample holder 5 and a photographic recording unit 15 positioned behind it. The X-ray source 13 consists of a high voltage source 9 and of an X-ray tube 8 (fine focus or line focus Roentgen tube) which tube 8 is enclosed by a cylindrical lead sheathing 10 having an aperture 11 at the X-ray exit. The high voltage source 9 and the X-ray tube 8 are contained in an L-shaped housing 2 which is mounted in a lying position on the base plate 1. The housing 2 has a short leg 2a and a long leg 2b. The X-ray tube 8 is situated in the short leg 2a of the L-shaped housing. The X-ray 12 is emitted from the X-ray tube 8 through the aperture 11 at an acute angle relative to the long leg 2b of the L-shaped housing 2 and is directed to the sample holder 5. The sample holder 5 abuts against a protective casing 4 which contains the recording unit 15 and which is mounted on the base plate 1 near the end of the long leg 2b of the L-shaped housing 2, opposite to the X-ray tube 8. The arrangement of the L-shaped housing 2 and of the protective casing 4 is made so as to ensure that the distance on the base plate 1 between the X-ray tube 8 and the sample holder 5 and the subsequently placed protective casing 4 is as long as possible.

At the side of the housing 2 opposite to that from which the shorter leg 2a of the L-shaped housing 2 projects, a chopper 3, required for the voltage transformation, is fitted between appropriate mountings on the base plate 1. At the side of the base plate 1 substantially diametrically opposite to the chopper 3, a current control and feed control block 7 as well as a blower 6 are secured near the edge of the base plate 1 between the L-shaped housing 2 and the protective casing 4.

The current control and feed control block 7 provides the appropriate electronic command signals to call for current from the external current source to operate the X-ray tube 8 and other elements of the apparatus, to activate the high voltage source 9 to produce the X-ray 12 in the X-ray tube 8, and to appropriately reset the photographic recording unit 15 between each record interval of exposure to the X-ray 12. The placement of the several elements as herein described is further restricted by the form factor of the cylindrical container and by the requirement that a clear path be maintained for passage of the X-ray 12 from the aperture 11 to the sample holder 5.

Figure 2:
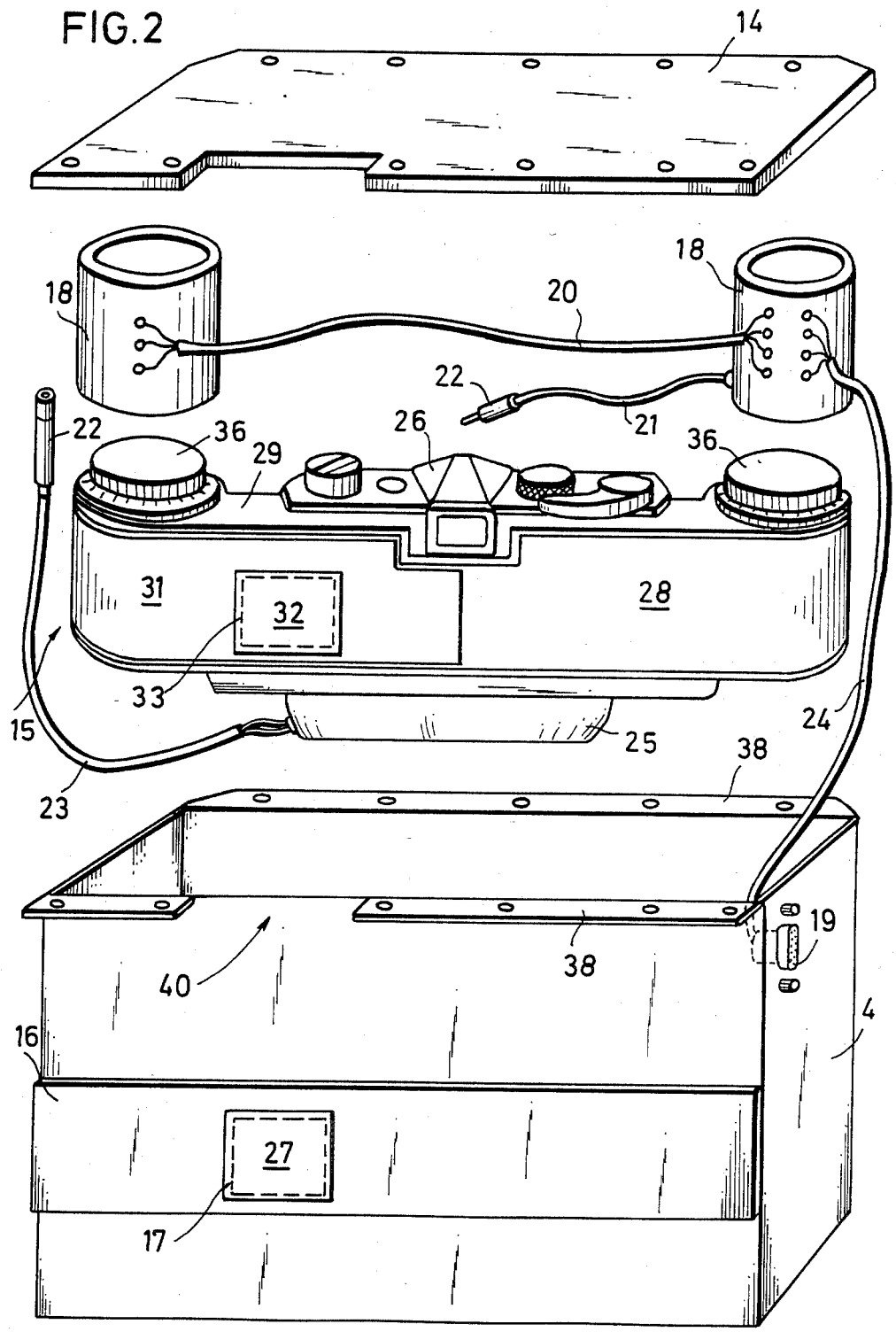
FIG. 2 is a perspective exploded view of the photographic recording unit.
Figure 3:
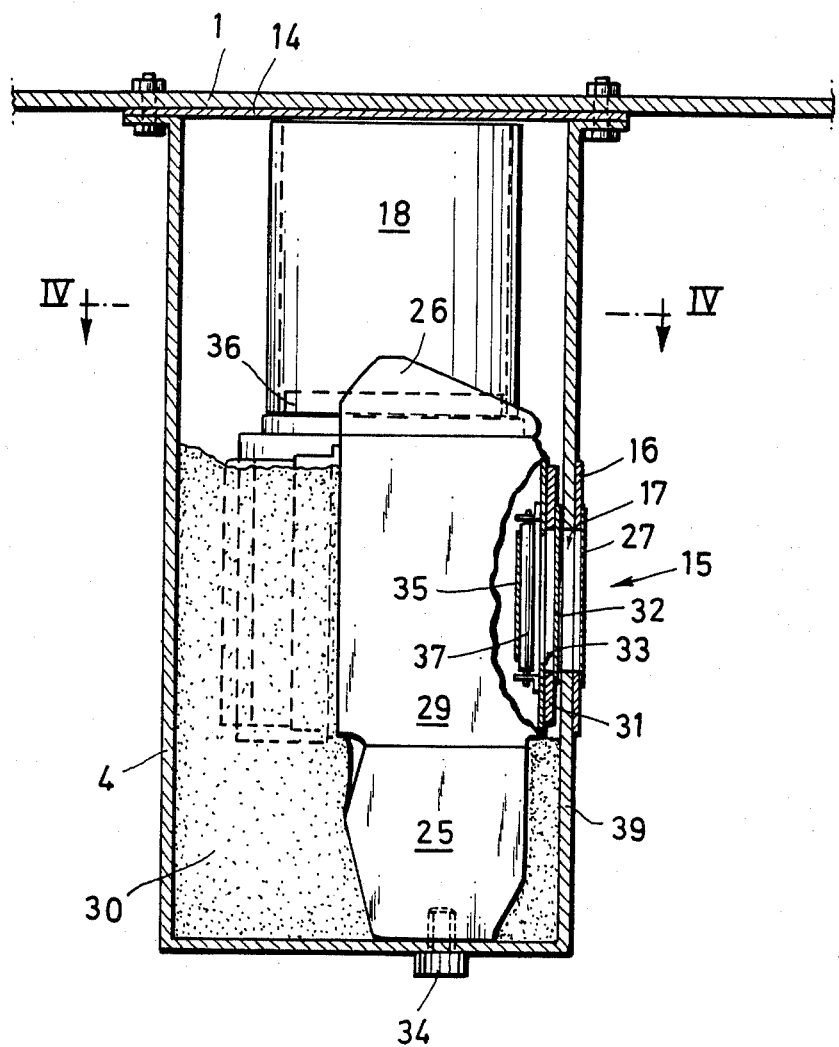
FIG. 3 is a schematic cross section of the photographic recording unit.
Figure 4:
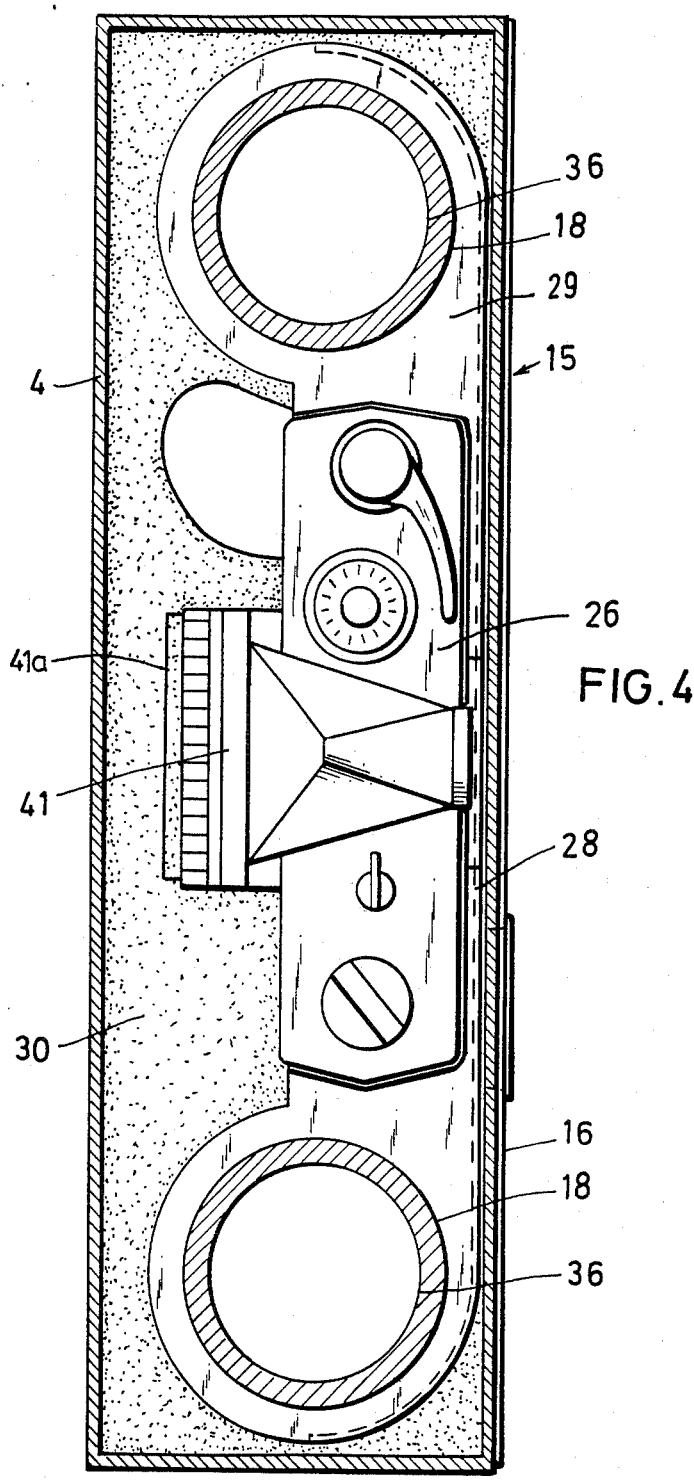
FIG. 4 is a section along line IV—IV of the recording unit shown in FIG. 3.

FIGS. 3 and 4 show the recording unit 15 in the padded protective casing 4 embedded in shock-absorbing padding material 30 which is adapted to the outer contour of the photographic elements. The photographic recording unit 15 consists of a miniature camera 26 and a winder motor 25 for the film transport of the miniature camera 26. The miniature camera 26 includes a film magazine 29 and has two tube portions 18 (FIG. 2) extending above its body. The protective casing 4 is connected with the motor 25 of the miniature camera 26 by means of a screw 34. The tube portions 18 each enclose one winding knob 36 of the film magazine 29 and are simultaneously guided by said knobs 36. The tube portions 18 have vertical extent sufficient to enable them to bridge the distance between a seal 14 affixed to the base plate 1 and the film magazine 29 thus supporting the miniature camera against the base plate 1 and the seal 14 in a fixed position. In an assembled condition, the camera 26 is positioned upside down on the two tube portions 18, the shock absorbing padding 30 is placed around the miniature camera 26, and the protective casing 4 is installed to cover the assembly. The two tube portions 18 also house electronic elements to provide the current supply and control of the motor 25 and are provided with terminals for cables 20, 21 and 24. Cable 20 provides the mutual electric connection of the two tube portions 18, while the electronic elements in the tube portions 18 are connected to the motor 25 for the film transport by cable 21 via a plug coupling 22 and a cable 23. Cable 24 extends from one of the two tube portions 18 to a socket 19 fitted at one lateral external wall of the protective housing 4. Socket 19 is the point of electrical connection at which the external current supply is introduced to the photographic recording unit 15. It is easily possible to separate and remove the padded protective housing 4, the motor 25 and thus the miniature camera 26 with the film magazine, by unscrewing the screw 34 and by disconnecting the plug coupling 22.

On the side of the protective casing 4 facing the X-ray 12, and extending over the total length of the cushioned protective casing 4, a strip-shaped lead mask 16 is affixed. The lead mask 16 is adapted to the width of a film 35 contained within the film magazine 29 of the miniature camera 26 and is situated at the height of the film 35 contained in the miniature camera 26. The lead mask 16 and the protective casing 4, each have a window 17 located in a common position which is adapted to the position of a picture window 33 in a rear wall 28 forming part of the body of the camera 26 when the recording unit 15 is assembled.

The window 17 is protected against incident light by an aluminum foil 27 which is affixed to the lead mask 16 and which projects over the window 17. The dimensions of window 17 and of the picture window 33 are substantially equal, the edges of the picture window 33 serving as an aperture stop for the X-ray picture.

Figure 5:
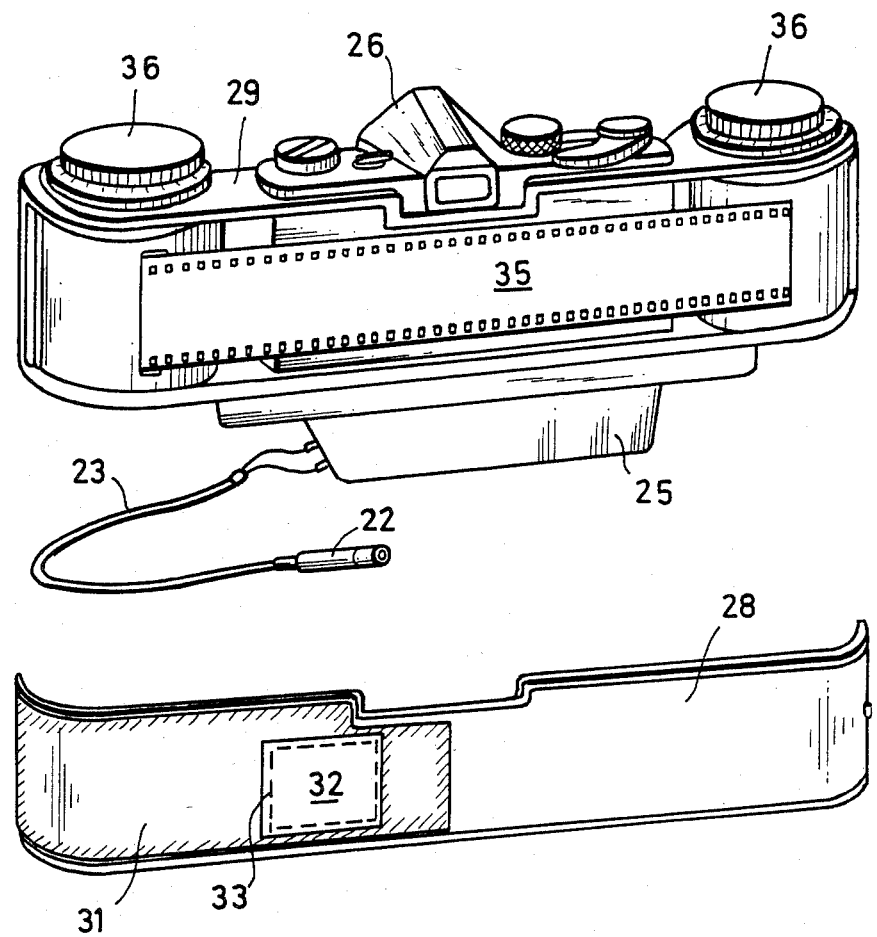
FIG. 5 is a perspective view of the miniature camera with film magazine and motor for the film transport, wherein the rear wall of the camera is removed.

Referring to FIG. 5, the outer surface of the rear wall 28 of the miniature camera 26 is coated with a lead foil 31 which contains an opening at the point of, and corresponding in area to, the picture window 33 which opening is covered with a second aluminum light-tight foil 32. Said second foil 32 is larger than the picture window 33, and its projecting marginal portion is affixed to the lead foil 31. Behind the picture window 33 within the miniature camera 26, support rollers 37 (FIG. 3) are fitted in proximity to the rear wall to guide the film 35.

Referring to FIG. 2, the edges of the longitudinal sides of the protective casing 4 which abut the seal 14 are fitted with a flange 38 ensuring the connection with the seal 14 and the base plate 1. The flange 38 includes a recess 40 to permit mounting the sample holder 5 directly adjacent to the protective casing 4 and in the vicinity of the film 35.

If, when assembled, the feed control of the device is started for taking X-ray pictures, film 35 is exposed by radiation of an X-ray 12 from the X-ray tube 8, which ray 12 has irradiated a sample in the sample holder 5. Upon termination of the radiation, film 35 is advanced by the width of the picture window 33 by action of the film transport motor 25, and is then ready for the next X-ray picture. The cycle time of the X-ray pictures and the coordination of the film transport operations are monitored by a feed control in the current control and feed control block 7 (FIG. 1). An image frequency of 3 frames per second is obtainable.

Referring again to FIG. 4, the front side of the miniature camera 26 has a lens bayonet 41, normally used for securing thereto a lens. In the instant case, no lens is required, because the X-ray pictures are taken through the rear wall 28. However, it may be convenient to project a picture of an indicating device 41a through the lens opening in order to bode in additional data on the film 35. Sufficient space is provided within the protective casing 4 to include such indicating device.

I claim:

1. Apparatus for recording X-ray radiation pictures in space, comprising:
    a common base plate,
    an X-ray radiation source, a high voltage supply for said X-ray radiation source, a photographic recording unit, and a sample holder adjacent to said photographic recording unit, all mounted on said base plate,
    an angular common housing on said base plate, said X-ray radiation source being housed in a first leg of said housing and said high voltage supply being housed in a second leg of said housing,
    the aperture of said X-ray radiation source being positioned so that X-rays from said source are directed at an acute angle relative to said second leg of said housing toward said sample holder and recording unit, said recording unit being situated in the vicinity of the free end of said second leg of said housing.

2. An apparatus according to claim 1, wherein said angular housing is L-shaped.

3. An apparatus according to claim 1, wherein said photographic recording unit is a miniature camera situated in a padded protective casing, said miniature camera comprising a film magazine containing a radiation-sensitive film, and a motor for the film transport, wherein the rear wall of said miniature camera includes a picture window for the passage of the X-ray.

4. An apparatus according to claim 3, wherein said protective casing protects the exposed and unexposed film within said film magazine by a lead mask extending over the total length of the outside facing of said protected casing on the side exposed to said X-ray radiations; and wherein said lead mask and said protective casing each have a window in common alignment.

5. An apparatus according to claim 4, wherein said window is covered by a first aluminum foil.

6. An apparatus according to claim 3, wherein said rear wall of said miniature camera is coated with a lead foil except over the area of said picture window, and wherein said picture window is covered with a second aluminum foil.

7. An apparatus according to claim 3, wherein said film is an X-ray film coated bilaterally with radiation-sensitive layers, said X-ray film having a miniature film perforation and offering space on said film for 150 consecutive X-ray pictures.

8. An apparatus according to claim 7, wherein said miniature camera is further comprised of a reinforcing sheet situated normal to the path of the X-ray radiation and in parallel with and adjacent to said film.

9. An apparatus as in claim 3, wherein said miniature camera is further comprised of a device for fading in data onto said film.

10. An apparatus for recording X-ray radiation pictures, particularly adapted for use in the cosmic space, comprising:
    X-ray radiation source means for producing controllably sequential bursts of X-ray radiation;
    sample holder means for holding a sample to be irradiated by said bursts of X-ray radiation; and
    photographic recording means for receiving and recording photographic images of said bursts of X-ray radiation passed through said sample in said sample holder; wherein said X-ray radiation source means, said sample holder means, and said photographic recording means are mutually mounted on a base plate so that said X-ray radiation source means and a high voltage source supplying said X-ray radiation source means are housed in an angular common housing, with said X-ray radiation source means contained within a first leg of said housing and said high voltage source contained within a second leg of said housing and wherein an aperture of said X-ray radiation source means is so positioned as to direct an X-ray, produced by said X-ray radiation source means, at an acute angle, relative to said second leg of said housing, toward said sample holder means which is situated on said base plate in the vicinity of the end of said second leg opposite that abutting said first leg of said housing.

11. An apparatus according to claim 10, wherein said angular common housing is formed as an L-shape disposed in a plane parallel to the surface of said base plate to which said housing is mounted.

12. An apparatus according to claim 10, wherein said photographic recording means comprises a miniature camera enclosed within a padded protective casing, said miniature camera including a film magazine within a common housing having a rear wall, within which film magazine is located an X-ray sensitive film;
    said rear wall having a window therein to enable exposure of said film by said X-ray radiation;
    said miniature camera further including a film transport having motor means for moving said film past said window.

13. An apparatus according to claim 12, wherein said padded protective casing includes a lead mask affixed to the outer surface of said casing on the side exposed to said X-ray radiations; said lead mask protecting the exposed and unexposed film within said film magazine; and wherein said lead mask and said protective casing each have a window therein at a common location enabling said X-ray radiation to expose said film over the area of said window.

14. An apparatus according to claim 13, wherein said window through said protective casing and said lead mask is covered by a first foil opaque to visible light but transmissive to X-ray radiation.

15. An apparatus according to claim 12, wherein said rear wall of said miniature camera is coated with a lead foil except over the area of said window.

16. An apparatus according to claim 13, wherein said rear wall of said miniature camera is coated with a lead foil, except over the area of said window in said rear wall.

17. An apparatus according to claim 15, wherein said window in said rear wall is covered with a second foil opaque to visible light but transparent to X-ray radiation.

18. An apparatus according to claim 16, wherein said window in said rear wall and said lead foil is covered with a second foil opaque to visible light but transparent to X-ray radiation.

19. An apparatus according to claim 18, wherein said film is coated bilaterally with X-ray radiation sensitive layers, said film having a miniature film perforation cooperating with said film transport and providing space on said film for at least 150 consecutive X-ray pictures.

20. An apparatus according to claim 19, wherein said miniature camera is further comprised of a reinforcing sheet situated normal to the path of the X-ray radiation and in parallel with and adjacent to said film.

21. An apparatus as in claim 20, wherein said miniature camera is further comprised of means for fading in data onto said film as part of each exposure.

22. An apparatus for recording X-ray radiation pictures, particularly adapted for use in the cosmic space, comprising:
a base plate member, having a substantially circularly shaped planar surface, and having a greatest diametric dimension such that said base plate is mountable within a cylindrical container;
means for coupling an external current source to said apparatus;
a high voltage source mounted on said base plate;
an X-ray radiation source mounted near the periphery of said base plate, said X-ray radiation source and said high voltage source being mutually enclosed in an angularly shaped housing wherein said X-ray radiation source is within a first leg of said housing and said high voltage source is within a second leg of said housing;
chopper means for performing the voltage transformation necessary to said X-ray radiation source, mounted to said base plate adjacent to the side of said second leg of said housing obverse to that from which said first leg depends;
a photographic recording unit mounted on said base plate substantially diametrically opposite said X-ray radiation source, said X-ray radiation source having an aperture through which X-ray radiation is emitted at an acute angle relative to said second leg and directed toward said photographic recording unit to impinge thereon substantially orthogonally;
said photographic recording unit consisting of a miniature camera including a body, a rear wall of said body, a film magazine, a film transport driving motor, and at least two tube elements containing electronic circuitry to control and operate said miniature camera and film transport drive motor, all surrounded by a volume of padded material such that the entire photographic recording unit is contained within a protective casing mounted on said base plate; said casing being covered with a protective lead mask affixed onto a surface facing said X-ray radiation source;
an X-ray sensitive film providing for a plurality of images frames;
a sample holder mounted on said base plate interposed in the path of said X-ray radiation, immediately adjacent said photographic recording unit;
a current control and feed control means for controlling the electrical current to said X-ray radiation source and to said film transport driving motor, said current control and feed control means being mounted on said base plate adjacent said X-ray radiation source such that no part of said current control and feed control means is located in the path of said X-ray radiation emitted by said X-ray radiation source; and
blower means for exhausting away air away from said base plate;
wherein said X-ray radiation source accepts high voltage electrical energy from said high voltage source in bursts controlled by said chopper means as commanded by said current control and feed control means, and thereon emits a burst of said X-ray radiation through said aperture toward said sample holder;
said sample holder, retaining a sample, to be irradiated by said X-ray radiation, receives said X-ray radiation burst, which is passed therethrough, including said sample and progressed toward said photographic recording unit;
said photographic recording unit receiving said X-ray radiation through a window in said protective casing and said lead mask, which window is covered by a first foil opaque to visible light but transparent to said X-ray radiation;
said rear wall of said miniature camera having a lead foil shield along its extent except at a picture window formed therein to be in substantial congruence with said window in said protective casing, said window being covered by a second foil opaque to visible light but transparent to said X-ray radiation; such that the X-ray radiation is transmitted therethrough to impinge on said film forming a photographic record; and
after the exposure of said film, said current control and feed control means causes said film transport drive motor to activate to transport said film to its next image frame position, whereat the next subsequent burst of X-ray radiation may be initiated.

* * * * *